Oct. 7, 1930.    A. A. HAMMER    1,777,918
FLUID CONDUCTOR
Filed Aug. 26, 1929
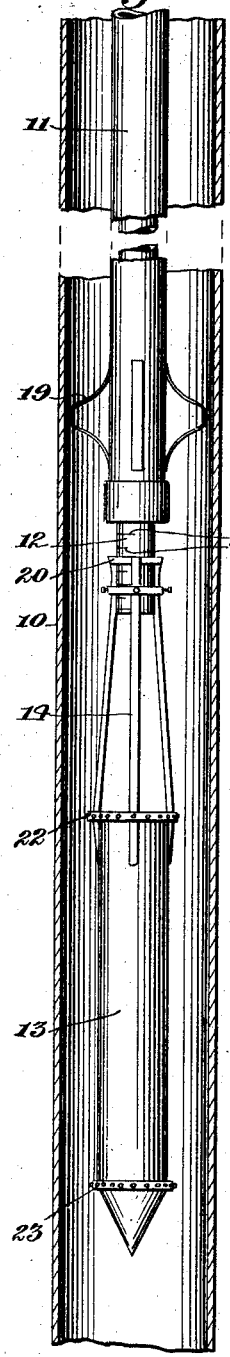
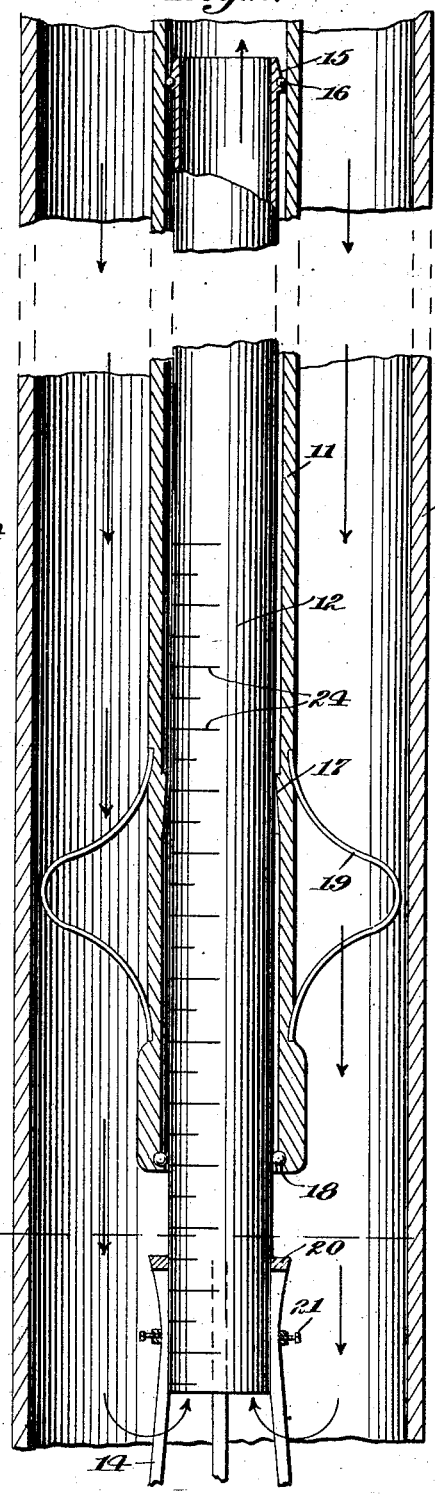
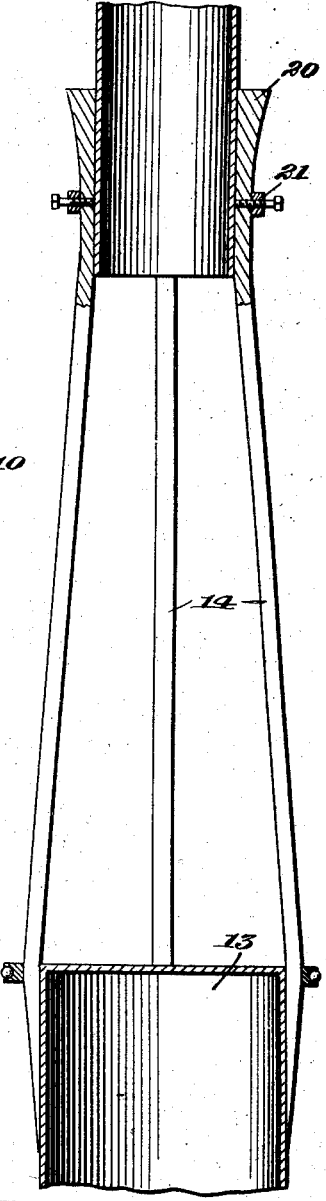
Inventor:
A. A. Hammer,
By
Riordan & Riordan
Att'ys.

Patented Oct. 7, 1930

1,777,918

UNITED STATES PATENT OFFICE

ALVA A. HAMMER, OF MUSKOGEE, OKLAHOMA

FLUID CONDUCTOR

Application filed August 26, 1929. Serial No. 388,416.

The present invention relates to devices for lifting, producing and bringing liquids, such as water, oil and other liquid substances, to the surface of the earth, from a well or wells or from one receptacle to another.

The invention is based on the principle of an inverted hydrometer, wherein the buoyancy of a liquid is utilized to carry the weight of a system of tubing, giving constant submergence to the intake orifice of any tubular or other material utilized as a conductor of liquids to a higher altitude from a well or from a lower container to one of greater altitude.

Since in all cases buoyancy is equal to the weight of the fluid displaced and the buoyancy or weight of the fluid displaced is equal to the weight of the body itself, it is evident that any freely moving body may be carried as a load equal to a given or desired weight of displaced liquid and conversely any given or desired weight or load will only displace a volume of liquid equal to its own weight and when that weight has been displaced the body will be at equilibrium whether on or below the surface of the fluid.

Among the objects of the present invention is the provision of a device designed to automatically cause a constant submergence of the intake orifice of a conductor, such as pipe or tubing used for raising liquid from a lower to a higher position under the influence of air or gas pressures. The device is so constructed that an inverted hydrometer cell of sufficient size and character is attached to a movable tubing so that the lower end or intake of the tubing is at a continuously fixed submergence relative to the surface of the liquid. If the liquid rises the cell and the intake orifice to which the cell is attached, rise, and if it falls the reverse applies.

Another object is the provision of means to adjust an inverted hydrometric cell relative to the intake orifice of the liquid conductor in accordance with the known specific gravity of the liquid which is to be withdrawn.

One of the greatest difficulties encountered in the present use of air or gas under pressure for flowing oil or other liquids from a well, is to place and maintain the bottom of the tubing or intake orifice at the proper position in relation to the surface of the fluid. It has been necessary, in order to start the movement of the oil to the surface, to utilize compressors of large capacity capable of developing high pressures, this because of the necessity of placing the bottom of the tubing some distance below the surface of the liquid, and utilizing the high pressures to start the fluid, a method known as "rocking the well".

Such procedure is unnecessary with the present invention as comparatively low pressures will be used from the start, as well as throughout the life of the well, due to the fact that the tubing may be made of any desired length, and because of the inverted hydrometric cell mentioned above, which may be set at or near the top of the fluid in the well. Pressures may then be used of the degree necessary to produce the desired amount of oil permitting the intake and float to reach a point in the well where a desired back pressure of fluid may be maintained.

Accordingly, another object of the invention resides in the utilization of low pressures and the avoidance of high pressures in the flowing of oil from a well, thus permitting the use of compressors of large capacity.

Further objects will appear as the description proceeds, and reference is made to the accompanying drawings, in which Fig. 1 discloses a section of a well with the invention shown in elevation therein;

Fig. 2 is an enlarged section of the well and tubing showing the intake member of the tubing; and Fig. 3 is a section showing connections between the intake member and the hydrometric cell.

Referring to the drawings in greater detail, 10 represents a well casing in which is inserted a column of tubing 11 of desired weight, length and character, which tubing will extend to any desired point above the well, for the purpose of conducting fluid from the well. Telescopically mounted within the lower end of the tubing 11 is another section of tubing 12 preferably formed of light, strong flexible metal less in diameter than the tubing through which it passes, and polished on the outside. This section 12, is open at each end and provides at its lower end the intake orifice for the entire liquid conduit.

A hydrometric cell 13 of any desired length, but less in diameter than the casing through which and in which it passes, and substantially less in size to permit the free passage of liquid around it, is provided, and has at one end thereof a framework 14 by means of which the cell and lower end of tubing 12 may be connected.

The tubing 11 is preferably polished thoroughly for a distance slightly greater than the length of the tubing 12 to facilitate telescoping of the section 12 therewithin.

At the upper end of the tubing 12 a row of ball bearings 16 are located, these bearings being set in the upper end of the flange 15. The bearings prevent any possibility of the upper end of tubing 12 becoming caught in the conduit 11, and the flange 15 acts as a support to prevent the tubing 12 from passing out when the cell lowers or when the tubing 11 is pulled from the well due to the fact that an abutment 17 is provided internally of tubing 11 and near the lower end thereof, which acts to engage the flange 15 and prevent further downward or outward movement thereof.

Other ball bearings 18 are located within the lower end of the tubing 11 to facilitate relative movement between the telescoping sections. Mounted exteriorly of the lower end of section 11 are a plurality of spring guides 19 for the purpose of centering the tubing in the well casing.

The framework 14 consists of several arms each attached at one end to the cell 13, and terminating in an annular flange 20 of sufficient diameter to prevent entry into the lower end of tubing 11, and thus effective to prevent fouling of the cell in the event that the liquid level rises in the well.

Any suitable means of attachment, such as set screws 21, may be provided in the arms of the framework, or in the flange, and these screws will serve to connect the framework to the lower end of this section of tubing. Ball bearings 22 and 23 may be provided at suitable points on the cell 13 to prevent friction which would tend to hold the cell against either an upward or downward movement.

A slight opening, due to the difference in diameters, will be provided between the outside of tubing 12 and the inside of tubing 11 through which some gas or air may pass to act as additional aeration above the point 16, and assist in raising the fluid. If too much gas passes, however, a packing flange may be placed above the point 18 to control the same.

As the present device is designed for use in any type of fluid regardless of density, and it is always desirable to have the intake orifice or lower end of section 12 just a slight depth below the surface of the liquid, means are provided to permit a change of relative position between the intake orifice and the cell.

The arms of the framework 14 are made of any desired length and as stated above are detachably connected to the section of tubing 12. Calibrations 24 are provided on the member 12 corresponding somewhat to the gravity scale of a conventional hydrometer float. With a known density of liquid, it will be obvious that the hydrometric cell 13 may be adjusted relative to the tubing 12, in accordance with the calibrations thereon, thus permitting an adjustment of the intake orifice in relation to the position of the cell in the liquid.

Although the term hydrometer float or submergence float is used in the description of the supporting means for the orifice of the tubing 12, it should be noted that this supporting means is not a float in the ordinary sense of the word and as generally used. There is a vast and concise distinction between a float, as generally understood, designed to rest on the surface of a liquid and which of necessity must be constructed to carry a definite and given load for a fluid of one definite specific gravity and a hydrometric cell or submergence float which can be adjusted to care for fluids of any specific gravity. To illustrate this distinction comparison may be made between a piece of cork and a hydrometer.

The hydrometric cell or submergence float 13 may be made of such size and capacity that it will support a given load for a float of an average or desired specific gravity. Any variation above or below this point may be taken care of by loosening the clamping means or set screw 21 or raising or lowering the intake orifice or bottom of tubing 12, so that it will be at the desired point below the surface of the liquid, regardless of gravity. With this method it is always possible to calculate the size of the float to carry a given load for a given specific gravity, and it is therefore unnecessary to construct floats for fluids of different specific gravities. The arms of the support or framework 14 may be of any length, for example, from ten to one hundred feet, thus allowing for a large range of adjustment depending upon the specific gravity of the float to be lifted. Therefore, the cell 13, depending on desired conditions, may be as much as from ten to one hundred feet or more below the surface of the liquid.

The tubing 11 may vary as much as from a few feet to four hundred or five hundred feet in length, thus giving a wide adaptability to the position of the intake according to the conditions desired in the operation.

In the case of an ordinary hydrometer the weight consists of a definite amount of mercury inside and at the bottom of the instrument, with the cell or vacuum chamber occupying the upper part and calibrated to read variations of either specific or Baumé gravity. In the present case the weight consists of the tubing and the framework, while the vacuum chamber is represented by the hydrometric cell 13, and the calibrations are on the outside of the tubing 12. Thus with the weight above the cell, exactly the reverse of the principle of a hydrometer is utilized, in that with a hydrometer, you determine the gravity while with the present invention you set the device to take care of known gravities, by setting the cell to correspond with the readings of the regular hydrometer according to calibrations on tubing 12.

The cell 13 is not a float in one sense, in that it does not of necessity float on the surface of the liquid, but rather maintains a position below the surface whereby to retain the intake orifice at a constant distance below the surface, in accordance with the particular adjustment between the cell and the tubing 12.

Having thus described my invention the operation thereof will be readily apparent.

Having determined the proper adjustment between the cell and the tubing the entire tubing 11 with the section 12 and the float 13 at the lower end thereof is introduced into the well and the intake orifice will assume a position below the level 25 of the liquid. Gas or air under pressure is then introduced from the casing head and will flow as indicated by the arrows in Fig. 2, forcing the liquid through the intake orifice of the tubing and up out of the well.

Under known operations in utilizing air or gas lifting means in the production of oil, it is necessary at frequent intervals to move the tubing up and down, thus necessitating considerable labor and expense. By the use of the present device this expense is to a large extent unnecessary as the tubing will only have to be changed at rare intervals, because of the telescoping feature. The submergence float may be utilized either on wells having "flush" production, or old wells that have reached the pumping stage, and the present cumbersome equipment may, to a large extent, be dispensed with, and the oil lifted to the surface either continuously or intermittently by a low pressure air or gas.

Having thus described my invention what I claim as new and desire to secure by Letters Patent of the United States, is:—

1. The combination with a fluid conductor having a ported portion for intake of the fluid, of means to position said portion below the fluid level, and calibrated means to assemble said portion and positioning means, in accordance with the gravity of the fluid to be conducted.

2. The combination with a fluid conductor having a ported portion for intake of the fluid, of means to position said portion a predetermined depth below the fluid level, such position being dependent upon the gravity of the fluid, and means to connect said portion to the positioning means.

3. The combination with a fluid conductor having a ported portion for intake of the fluid, of means to position said portion a predetermined depth below the fluid level, such position being dependent upon the gravity of the fluid, and adjustable means to connect said portion to the positioning means.

4. The combination with a fluid conductor having a ported portion for intake of the fluid, of means to position said portion a depth below the fluid level, and calibrated adjustable means to connect said portion to the positioning means.

5. The combination with a fluid conductor having a ported portion for intake of the fluid, of means to position said portion a predetermined depth below the fluid level, and adjustable means to connect said portion to the positioning means, said portion being calibrated whereby to permit a proper adjustment between said positioning means and said portion.

6. The combination with a fluid conductor having a ported portion for intake of the fluid, of hydrometric means to position said portion a predetermined depth below the fluid level dependent upon the specific gravity of the fluid, and means to connect said portion to the hydrometric means.

7. The combination with a fluid conductor having a ported portion for intake of the fluid, of a hydrometric cell effective to position said portion a predetermined depth below fluid level in accordance with the gravity of the fluid, and adjustable means to connect said portion to the hydrometric cell.

8. The combination with a fluid conductor having a ported portion for intake of the fluid, of a hydrometric cell effective to position said portion a predetermined depth below fluid level in accordance with the gravity of the fluid, and adjustable means to connect said portion to the hydrometric cell, said portion being calibrated whereby to permit variation of the adjustment in accordance with variations in the gravity of the fluid.

9. The combination with a fluid conductor having a ported portion for intake of fluid, of a hydrometric cell to position said portion a predetermined depth below the fluid level, said portion being mounted in telescoping relation to the body of said conductor, and means to connect said portion to the hydrometric cell.

10. The combination with a fluid conductor having a ported portion for intake of fluid, of a hydrometric cell connected to said portion to position the same a predetermined depth below the fluid level, said portion being mounted in telescoping relation to the body of said conductor, and means to limit telescoping movement between the conductor and said portion.

11. The combination with a fluid conductor having a ported portion for intake of fluid, of a hydrometric cell connected to said portion to position the same a predetermined depth below the fluid level, said portion being mounted in telescoping relation to the body of said conductor, and means to limit telescoping movement in both directions.

12. Liquid conducting means for carrying liquid from a well, comprising a tubing extending into the well, and having an intake portion at one end, means to locate said intake portion a predetermined depth below the surface of the liquid, such location being dependent upon the gravity of the liquid, said intake portion being telescopically mounted in the tubing thereby to accommodate variations in liquid level.

13. Liquid conducting means for carrying liquid from a well, comprising a tubing extending into the well, and having an intake portion at one end, means to locate said intake portion a predetermined depth below the surface of the liquid, said intake portion being telescopically mounted in the tubing thereby to accommodate variations in liquid level, and means to limit the outward movement between the tubing and said portion.

14. Liquid conducting means for carrying liquid from a well, comprising a tubing extending into the well, and having an intake portion at one end, means to locate said intake portion a predetermined depth below the surface of the liquid, said intake portion being telescopically mounted in the tubing thereby to accommodate variations in liquid level, means to limit the outward movement between the tubing and said portion, and means to facilitate movement between said portion and said tubing.

15. Liquid conducting means for carrying liquid from a well, comprising a tubing extending into the well, and having an intake portion at one end, calibrated hydrometric means to position said portion below the surface of the liquid and in accordance with the gravity of the liquid, said intake portion being telescopically mounted in the tubing thereby to accommodate variations in liquid level, said hydrometric means being provided with means to prevent fouling thereof in the well.

16. Liquid conducting means for carrying liquid from a well, comprising a tubing extending into the well, and having an intake portion at one end, calibrated hydrometric means to position said portion below the surface of the liquid and in accordance with the gravity of the liquid, said intake portion being telescopically mounted in the tubing thereby to accommodate variations in liquid level, said hydrometric means being provided with means to prevent fouling thereof in the well, said non-fouling means comprising anti-friction bearings externally of the hydrometric means and a flange at one end thereof to limit telescopic movement relative to the tubing.

17. In a system for removing fluid from a well utilizing a conductor from the well and gas pressure to force the contents of the well through said conductor, the combination with an inverted hydrometer comprising a hydrometric cell, a framework thereabove and an open calibrated tube supported by said framework and providing an intake orifice for said conductor, and means to mount said tube in operative relation to said conductor.

18. In a system for removing fluid from a well utilizing a conductor from the well, and gas pressure to force the contents of the well through said conductor, the combination with an inverted hydrometer comprising a hydrometric cell, a framework thereabove and an open calibrated tube supported by said framework and providing an intake orifice for said conductor, and means to telescopically mount said tube in operative relation to said conductor.

19. The combination with a fluid conductor having a ported portion for intake of fluid, of completely submergible means to position said portion below the fluid level, and means to connect said portion to the positioning means.

20. The combination with a fluid conductor having a ported portion for intake of fluid, of means connected to said portion, and completely submergible to a known depth below the surface of the fluid, thereby to position said portion below the fluid level.

In testimony whereof I hereunto affix my signature.

ALVA A. HAMMER.